(12) United States Patent
Marquez Gomez et al.

(10) Patent No.: US 8,631,741 B2
(45) Date of Patent: Jan. 21, 2014

(54) MACHINE FOR THE PRODUCTION OF OIL (75) Inventors: Amador Marquez Gomez, Cambrils (ES); Telm Costa Escoda, Cambrils (ES)

(73) Assignee: Mediterranea Identitat, S.L. (ES)

( * ) Notice: Subject to any disclaimer, the term of this patent is extended or adjusted under 35 U.S.C. 154(b) by 128 days.

(21) Appl. No.: 13/002,099

(22) PCT Filed: Jul. 2, 2008

(86) PCT No.: PCT/ES2008/070131
§ 371 (c)(1),
(2), (4) Date: Apr. 11, 2011

(87) PCT Pub. No.: WO2010/000885
PCT Pub. Date: Jan. 7, 2010

(65) Prior Publication Data
US 2011/0179955 A1 Jul. 28, 2011

(51) Int. Cl.
*A23N 1/00* (2006.01)
*C11B 1/06* (2006.01)

(52) U.S. Cl.
USPC .................................. 99/501; 99/495; 99/496

(58) Field of Classification Search
USPC ........................................... 99/501, 495, 496
See application file for complete search history.

(56) References Cited

U.S. PATENT DOCUMENTS

| | | | | |
|---|---|---|---|---|
| 2,227,098 A * | 12/1940 | Maclean | ........................... | 99/512 |
| 3,519,052 A * | 7/1970 | Girgis | ............................. | 99/610 |
| 4,522,119 A * | 6/1985 | Finch et al. | ...................... | 99/483 |
| 5,074,202 A * | 12/1991 | Sanjuan | ........................... | 99/511 |
| 5,408,922 A * | 4/1995 | Gupta | ............................. | 99/483 |
| 6,012,385 A * | 1/2000 | Gibson | ........................... | 99/511 |
| 6,295,921 B1 * | 10/2001 | Stoev | .............................. | 99/507 |
| 6,347,580 B1 * | 2/2002 | Huang | ............................ | 99/504 |
| 6,640,696 B2 * | 11/2003 | Shinobudani et al. | .......... | 99/467 |
| 6,861,083 B2 * | 3/2005 | Martel et al. | .................. | 426/481 |
| 2004/0074402 A1 * | 4/2004 | Gajjar | ............................. | 99/495 |
| 2008/0102178 A1 * | 5/2008 | Thakur et al. | ................. | 426/511 |

FOREIGN PATENT DOCUMENTS

| | | | | |
|---|---|---|---|---|
| EP | 0581748 | * | 7/1993 | ............... A23N 1/02 |
| EP | 0557758 A | | 9/1993 | |
| EP | 0581748 A | | 2/1994 | |
| EP | 0581748 A1 * | | 2/1994 | ............... A23N 1/02 |
| EP | 1767104 | * | 2/2006 | ............... A23N 1/02 |
| EP | 1767104 A | | 3/2007 | |
| EP | 1767104 A2 * | | 3/2007 | ............... A23N 1/02 |
| ES | 2093572 | | 12/1996 | |

(Continued)

OTHER PUBLICATIONS

International Search Report dated May 4, 2009, issued in corresponding international application No. PCT/ES2008/070131.

*Primary Examiner* — Henry Yuen
*Assistant Examiner* — Jimmy Chou
(74) *Attorney, Agent, or Firm* — Ostrolenk Faber LLP (57) ABSTRACT

The machine has a single body (1) which integrates mixers (4) in correspondence with containers (3) which contain the paste, a centrifuge (7) equipped with housings (11) designed to house in individualized manner and in radial arrangement each one of the containers (3) which contain the already mixed paste, means of pumping (12, 16, 17) or pressing which exerts a pressure on the liquid produced after the centrifugation, and a filter (14) positioned after the means of pumping (12, 16, 17) for the definitive production of the oil.

11 Claims, 5 Drawing Sheets

(56) References Cited

FOREIGN PATENT DOCUMENTS

| GB | 206181 A | 11/1923 |
| GB | 1071830 A | 6/1967 |
| WO | WO 99/61568 A | 12/1999 |
| WO | WO 2004/011580 | 2/2004 |

\* cited by examiner

MACHINE FOR THE PRODUCTION OF OIL

CROSS REFERENCE TO RELATED APPLICATIONS

The present application is a 35 U.S.C. §371 National Phase conversion of PCT/ES2008/070131, filed Jul. 2, 2008, the disclosure of which is incorporated herein by reference. The PCT International Application was published in the Spanish language.

OBJECT OF THE INVENTION

The present invention relates to a machine for the production of oil from a paste, preferably for the production of olive oil from olive paste.

The object of the invention consists of a machine fundamentally aimed for its domestic use or for its application in the restaurant industry for the instantaneous production of oil, simply and quickly from paste.

The machine is preferably devised with the motive of achieving an exclusive oil, of excellent organoleptic characteristics, which can be instantly consumed after its production and without the need to be subjected to later processes or to the addition of substances for its preservation.

BACKGROUND OF THE INVENTION

Below, some patent applications and patents of invention related to olive oil production are disclosed.

Patent application WO 99/61568 relates to a method and apparatus for producing olive oil, which proposes its production in an industrial process in continuum which starts with the crushing of the olive, without crushing the stone, in a hopper equipped in its base with rollers, followed by the subsequent grinding and removal of the olive pulp in a grinder. Then, the olive paste, mixed with water, is subjected to a process of separation and extraction in a device equipped with pallets, to finally give the oil. It additionally contemplates the possibility of incorporating an intermediate decanter and a final decanter.

Document EP 0 581 748 discloses an apparatus of the compact type wherein a receptacle can be observed wherein the olives are ground until producing a paste, then giving free rein to the passage of hot water which is introduced in this receptacle. The mixture formed by paste and water overflows from the receptacle falling in a decanter consisting of a container which surrounds the receptacle and which has a filter to facilitate decanting of the oil.

Document IT 048440 relates to a machine for the small production of olive oil devised for small scale productions which is equipped with an operating scheme similar to that described in the previous paragraph, incorporating for said purpose a mixing mechanism within a container wherein the olive is introduced, which is then mixed with hot water to produce a paste which overflows, falling into a decanter. Unlike the previous document, the decanter is an independent module of the container, but both are mounted on a single frame.

Patent application ES 2 093 572 discloses a procedure and a machine for the treatment of olives and the production of the individual products, water from pure olive, olive pulp and stones intact, which collects a solution in continuum wherein the olive is mixed with water, it is made to pass through a separating device by friction and cutting/abrasion of the olive flesh. It then consists of a first filtration device to separate the stone, a second pressing device to separate the olive water, a press and a water-oil separator.

On the other hand, patent application WO 2004/011580 discloses an olive oil extraction plant which operates at low temperatures which has a column where the crushing and production of the olive paste is carried out by a knife and worm, then having a percolation extractor provided with a frame with grilles wherethrough the paste is pressed with the aid of a blade.

DESCRIPTION OF THE INVENTION

The machine for the production of oil which constitutes the object of the invention proposes a compact and integral solution for the production of oil instantaneously from a paste, preferably olive oil from olive paste, which pursues the production of an exclusive product which can be instantly consumed for a domestic application or in the restaurant industry, for example. The application of this machine is also considered for the production of oil from peanut, hazelnut paste or other products or mixtures of these and other products.

It is a functionally simple and fast machine that can be used by any user, without the need to have specialized knowledge, for the production of oil for own consumption.

The machine for the production of oil fundamentally comprises a single body which includes in integrated manner a series of elements which facilitate the sequential execution of a series of operations on the paste for the production of oil.

The machine is devised so that within the same body the operations can be performed of mixing of the paste for the formation of an oily phase, subsequent centrifugation, followed by, preferably, its subjection to pressing and final filtration.

According to this sequence, it contemplates that the machine incorporates with general character a single body which integrates: at least one mixer designed to mix the paste, a centrifuge where the centrifugation of the paste is performed for the production of a liquid and a solid, and additionally and optionally: means of pumping or pressing which exert a pressure on the liquid, and a filter positioned after the means of pumping which determine the filtration of the liquid and its separation in water and oil. The machine is devised preferably for the treatment of the paste housed in containers, in this case the machine has an intake sector designed for the reception of at least one of said containers. In correspondence with this intake sector is found at least one mixer, preferably disposed in vertical position and equipped with blades which rotate due to the action of a motor in the interior of the container mixing the paste. Normally, on this intake sector are positioned several containers and a mixer will be disposed in correspondence with each container.

It is provided that this intake sector can be materialized for example in a platform and that it can have associated a lifting and lowering mechanism which facilitates the vertical movement of this platform and therefore the approximation or separation of the interior of the containers to the blades of the mixers.

The machine also has within its body a centrifuge devised for the separation of the liquid phase of the paste. The centrifuge can adopt different configurations.

In a preferred configuration, the centrifuge is equipped with a rotor associated to a support which has a series of arms or hooks which define housings designed to house in individualized manner and in radial arrangement each one of the containers which contain the already mixed paste.

This rotor rotates at high speed due to action of a motor and, therefore, together with this the arms or hooks, to thus perform the centrifugation of the oil paste in the interior of the containers, which gives rise to the separation the liquid phase fundamentally composed of water and oil, with respect to the solid phase. The solid phase will normally then be discarded and the liquid phase will be subjected to pressure and filtration.

This rotor is in the interior of a receptacle defined in the body, complementarily having a cover which covers at least this receptacle and in its closed position permits that the centrifugation operation takes place in its interior, thus avoiding that splashes to the outside occur, as well as contributing to the rotating action of the rotor and the operation of the device with safety for the user.

On the other hand, the machine comprises, optionally and preferably, means of pressing and pumping which exert a pressure on the liquid produced after the centrifugation for its subsequent directing towards filtration means which determines the separation of the water, which remains in the filter, and the definitive production of the oil which falls, for example, in a jar positioned after it.

It contemplates the possibility of these pressing or pumping means consisting of a pressure plunger which is displaced in vertical direction in the interior of a cylinder, exerting a pressure on the liquid on its downward stroke.

Another possible solution contemplates that the means of pressing or pumping consists of a peristaltic pump positioned immediately after a tray whereon is poured the liquid, which is equipped with an outlet which is communicated with the intake of the pump. As in the previous case, and immediately below the filter, the jar is found wherein the finally filtered oil will fall.

It should be highlighted that this machine is applicable for the production of oil from a paste which can originally contain added components which give rise to oils of different tastes, as well as it being especially applicable for its use with an olive paste which is previously frozen according to a process which is set down in a patent application from the same applicant of the present invention.

In this case, the olive paste, once ground and treated conveniently, is frozen and stored in bags, for example, or in the same containers used for the mixing and centrifugation of the paste according to the same philosophy which is disclosed in this invention of offering a product for domestic use. In this case, and before its use in the machine object of this invention, the olive paste is defrosted and optionally would be adjusted to its optimum temperature, then introducing it in the aforementioned containers for its processing in the machine according to the sequence described giving rise to the final production of the oil. There is, therefore, a clear relation of this machine with its application for the product although its generalized use with olive paste which has not been subjected to freezing is not rejected.

The operating sequence of the machine for the production of oil according to the invention takes place simply and does not require the user's specialized knowledge for its execution, in any case, this machine can incorporate an automated system which has means of displacement or transfer of the container and/or paste among the different mechanisms of the machine which function autonomously and in related form according to the established sequence.

On the other hand, alternatively to the solution proposed, the possibility is contemplated that the machine can incorporate a slightly different operating sequence, performing the pumping or pressing on the paste before centrifugation, in this case the machine comprises a single body which integrates: at least one mixer designed to mix the paste, means of pumping or pressing which exerts a pressure on the paste for the production of liquid, a centrifuge where the centrifugation of liquids is performed, and optionally a filter for the filtration of the liquid and its separation in water and oil.

In this case, the location of the filter would be different to that previously provided and independent of the means of pumping.

DESCRIPTION OF THE DRAWINGS

To complement the description being made and in order to help towards a better understanding of the characteristics of the invention, according to a preferred practical embodiment thereof, a set of drawings is attached as an integral part of said description wherein, with illustrative and non-limitative character, the following has been represented.

PREFERRED EMBODIMENT OF THE INVENTION

In light of said figures, below, two preferred embodiments are shown of the machine for the production of oil which constitutes the object of this invention.

Figure 1:
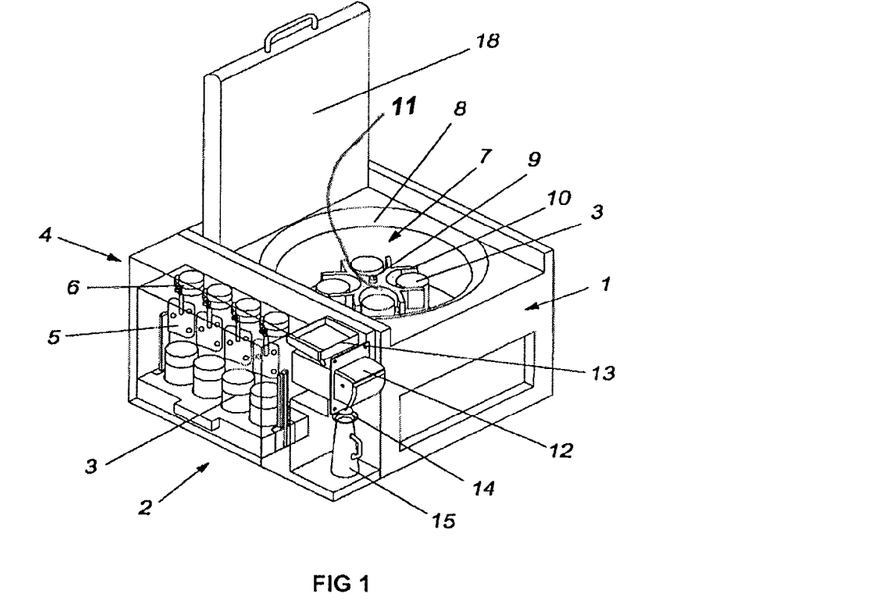
FIG. 1.—Shows a perspective view of a first embodiment of the machine for the production of oil from paste.

As observed in FIG. 1, the machine for the production of oil shows a compact configuration which comprises a single body or frame (1) wherein is integrated in first place an intake sector (2) designed to receive several containers (3) which contain the paste. In correspondence with this intake sector (2) and with each one of the containers (3) are respective mixers (4) formed by blades (5) and drive motor (6) designed to mix the paste contained in the containers (3).

Likewise, this FIG. 1 shows that within the body (1) is located a centrifuge (7) located in a receptacle (8) which is configured by a rotor (9) actuated by a motor, not represented, whereto are associated hooks (10) which define radial housings (11) designed to receive the containers (3) which contain the already mixed paste.

The machine additionally has means of pumping (12, 16, 17), in the case of FIG. 1 the means of pumping (12, 16, 17) comprises a peristaltic pump (12) which has in correspondence with its intake a tray (13) designed to receive by pouring the liquid separated in the centrifuge, for its subsequent pressing. Immediately under this peristaltic pump (12) is located a filter (14) whereby the liquid is filtered, so that the water remains in the filter (14), separating the oil which falls into a jar (15).

Figure 2:
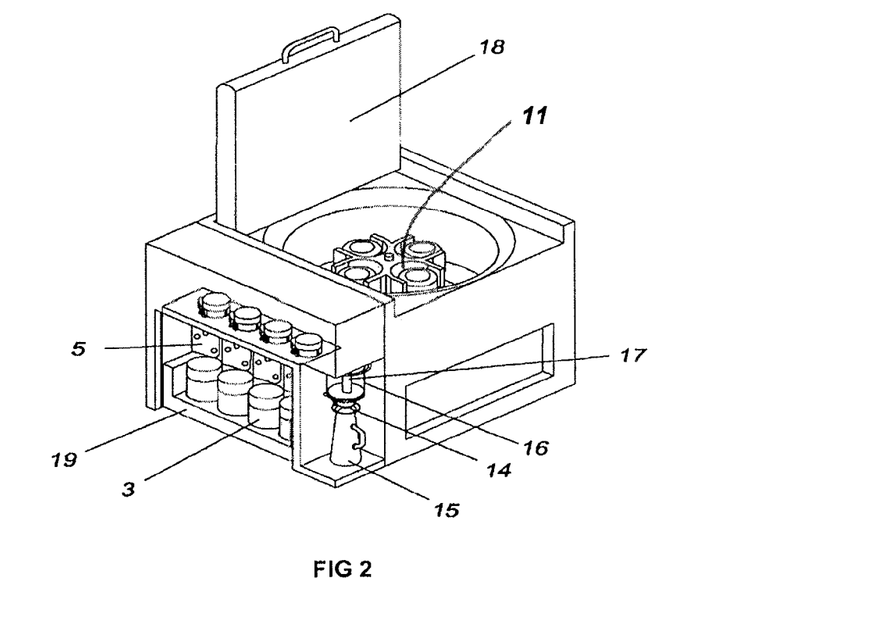
FIG. 2.—Shows a perspective view of a second embodiment of the machine for the production of oil.

In the case of the embodiment represented in FIG. 2, the same diagram represented in FIG. 1 is repeated with the exception of the means of pumping (12, 16, 17), which in this case comprise a cylinder (16) which integrates a plunger (17) of vertical displacement, which, in its down stroke, presses the liquid separated in the centrifugation to carry it to said filter (14) finally producing the oil which falls into the jar (15).

The machine shows in both embodiments represented in FIGS. 1 and 2, a cover (18) in open position, which, once closed, will cover the receptacle (8) wherein the centrifuge (7) works.

Below, and in relation to FIGS. 3 to 10, the operating sequence for the production of oil is disclosed by the second embodiment of the machine of the invention.

Figure 3:
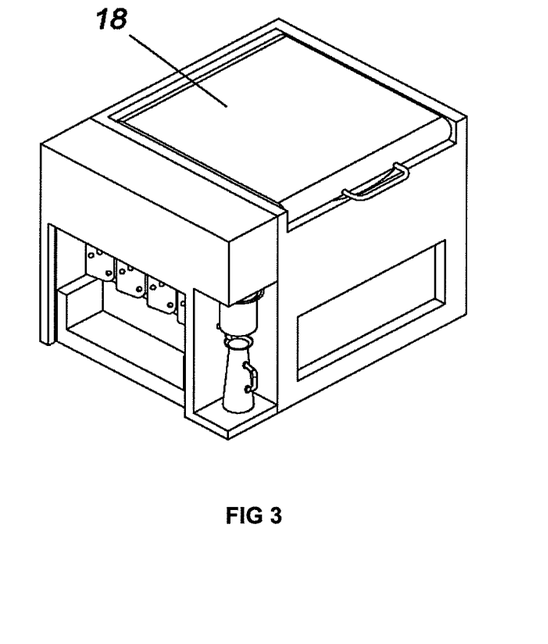
FIGS. 3 to 10.—Shows a sequence of the operations which take place in the second embodiment of the machine for the production of oil from paste.
Figure 4:
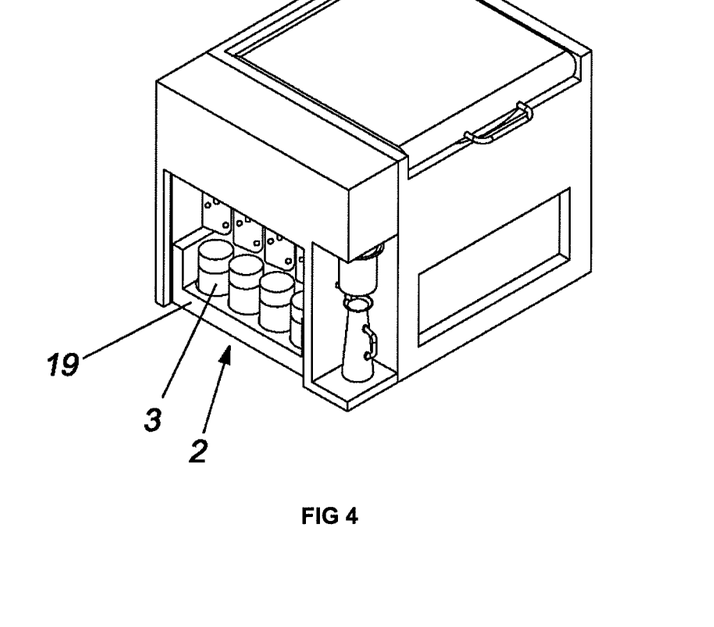
Figure 5:
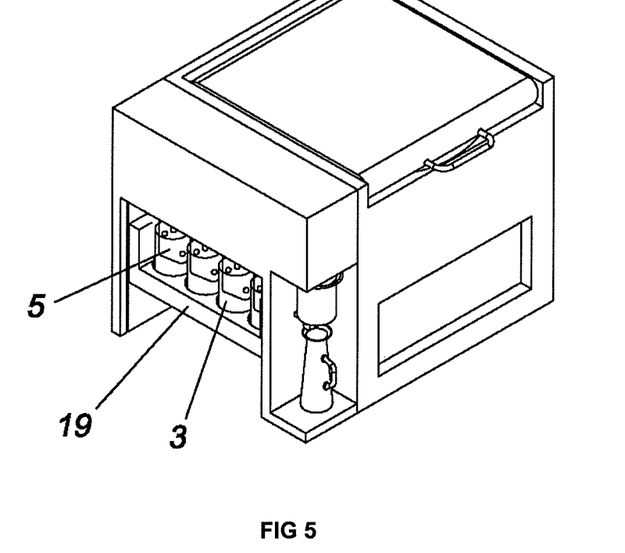

FIG. 3 shows the machine with the cover (18) closed ready to receive the containers (3) with paste. Then, in FIG. 4 it is observed that the containers (3) are positioned in the intake sector (2) of the machine, formed by a platform (19), in this case displaceable in vertical direction and guided by its lateral sides, which as is displayed in FIG. 5 in raised position gives rise to the blades (5) of the mixers (4) being introduced in the containers (3).

Figure 6:
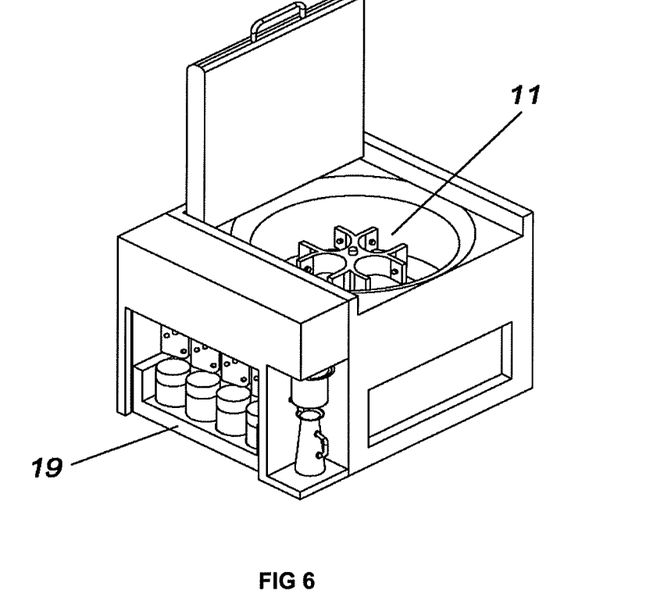
Figure 7:
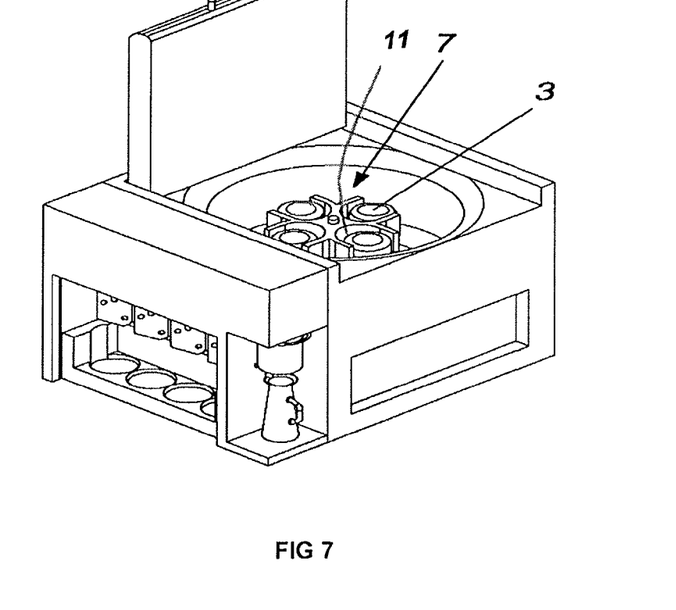
Figure 8:
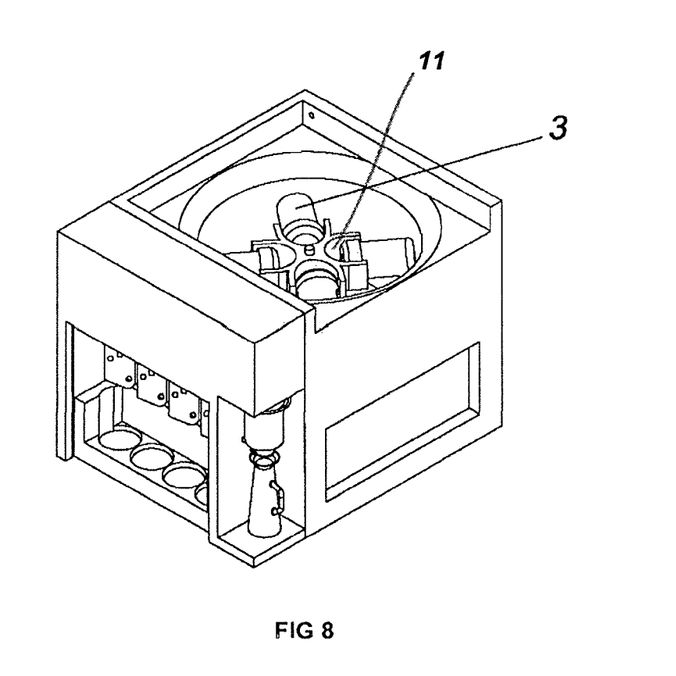
Figure 9:
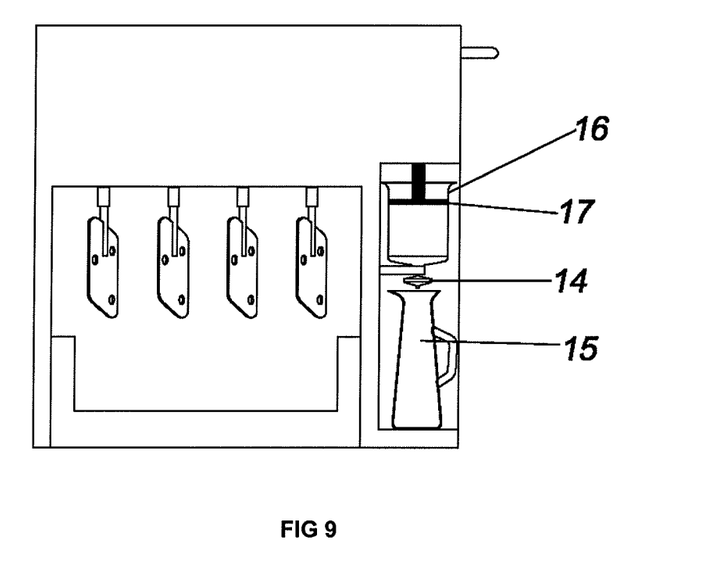
Figure 10:
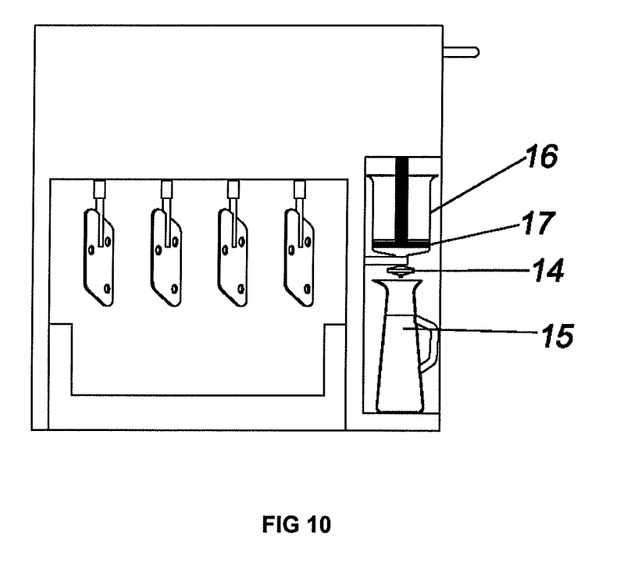

Once the paste is mixed by the mixers (4), the platform (19) lowers as appears in FIG. 6 to facilitate the extraction of the containers (3). Then, the containers (3) are positioned in the centrifuge (7), specifically in the radial housings (11), as represented in FIG. 7, for its centrifugation. FIG. 8 shows the horizontal position the containers (3) have adopted during the centrifugation. Then, the liquid phase of the paste which has been separated in the centrifuge is poured in the cylinder (16) shown in FIG. 9, where it is pressed by the plunger (17) and subsequently filtered by the filter (14) represented in FIG. 10 until producing the oil which exists towards the jar (15).

What is claimed is:

1. A machine for domestic production of oil from previously produced and conserved paste, the machine comprising:
    a body or frame;
    at least one mixer positioned and configured to mix the paste;
    a centrifuge configured to centrifuge the paste so as to produce a liquid, or a liquid and a solid;
    a pressure unit positioned and configured to exert pressure on the liquid; and
    a filter positioned after the pressure unit and configured to determine filtration of the liquid and separation of the liquid in water and oil;
    wherein the, at least one mixer, the centrifuge, the pressure unit, and the filter are integrated in the body;
    wherein the at least one mixer is equipped with blades for mixing the paste, the machine further comprising:
    an intake sector configured to receive at least one container which houses the paste;
    the at least one mixer positioned in correspondence with the at least one container;
    a platform, comprised in the intake sector; and
    a lifting and lowering mechanism, comprised in the intake sector, for providing the platform with a vertical movement, so as to allow the blades to be introduced in or extracted out of the containers.

2. The machine of claim 1, wherein the at least one mixer is in vertical position and the blades are positioned and configured to be rotated in an interior of the container by action of a motor.

3. A machine for domestic production of oil from previously produced and conserved paste, the machine comprising:
    a body or frame;
    a plurality of mixers equipped with blades, the mixers being positioned and configured to mix the paste;
    a centrifuge configured to centrifuge the paste so as to produce a liquid, or a liquid and a solid;
    a pressure unit positioned and configured to exert pressure on the liquid; and
    a filter positioned after the pressure unit and configured to determine filtration of the liquid and separation of the liquid in water and oil;
    wherein the mixers, the centrifuge, the pressure unit, and the filter are integrated in the body;
    an intake sector configured to receive a plurality of containers which house the paste; and each mixer positioned in correspondence with a respective container;
    wherein each mixer is in a vertical position and the blades are positioned and configured to be rotated in an interior of the containers by action of a motor;
    wherein the intake sector comprises:
    a platform; and
    a lifting and lowering mechanism configured to provide vertical movement for the platform, so as to enable the blades to be introduced into or extracted out of the containers.

4. The machine of claim 3, wherein the centrifuge comprises:
    a rotor associated to a support;
    the support comprising a series of hooks which define housings positioned and configured to house in individualized manner and in radial arrangement each one of the containers which contain the already mixed paste.

5. The machine of claim 4, wherein the rotor is in the interior of a receptacle defined in the body.

6. The machine of claim 5, further comprising a folding cover designed to cover at least said receptacle.

7. The machine of claim 1, wherein the pressure unit comprises:
    a peristaltic pump having an intake; and
    a tray in correspondence with the intake, the tray being configured receive by pouring the liquid for the liquid.

8. The machine of claim 1, wherein the pressure unit comprises a cylinder,
    the cylinder integrating a plunger for vertical displacement in an upward stroke and a downward stroke,
    the plunger being configured so as to press the liquid in the downward stroke for carrying the liquid to the filter.

9. A machine for domestic production of oil from previously produced and conserved paste, the machine comprising:
    a body or frame;
    at least one mixer positioned and configured to mix the paste;
    a pressure unit positioned and configured to exert pressure on the paste for the production of a liquid; and
    a centrifuge configured to centrifuge the liquid;
    wherein the at least one mixer, the centrifuge, and the pressure unit are integrated in the body,
    the machine further comprising:
    an intake sector configured to receive at least one container which houses the paste,
    a platform, comprised in the intake sector; and
    a lifting and lowering mechanism, comprised in the intake sector, and configured to provide the platform with a vertical movement, so as to allow blades for mixing the paste to be introduced in or extracted out of the at least one mixer.

10. The machine of claim 9, further comprising a filter integrated in the body and configured to filter the liquid and to determine separation of the liquid in water and oil.

11. The machine of claim 1, wherein the paste is olive paste and the oil produced is olive oil.

* * * * *

UNITED STATES PATENT AND TRADEMARK OFFICE
CERTIFICATE OF CORRECTION

PATENT NO. : 8,631,741 B2
APPLICATION NO. : 13/002099
DATED : January 21, 2014
INVENTOR(S) : Marquez Gomez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this
Twenty-second Day of September, 2015

Michelle K. Lee
*Director of the United States Patent and Trademark Office*